(No Model.)
G. W. PARKER.
AXLE LUBRICATOR FOR CARS.
No. 399,627. Patented Mar. 12, 1889.
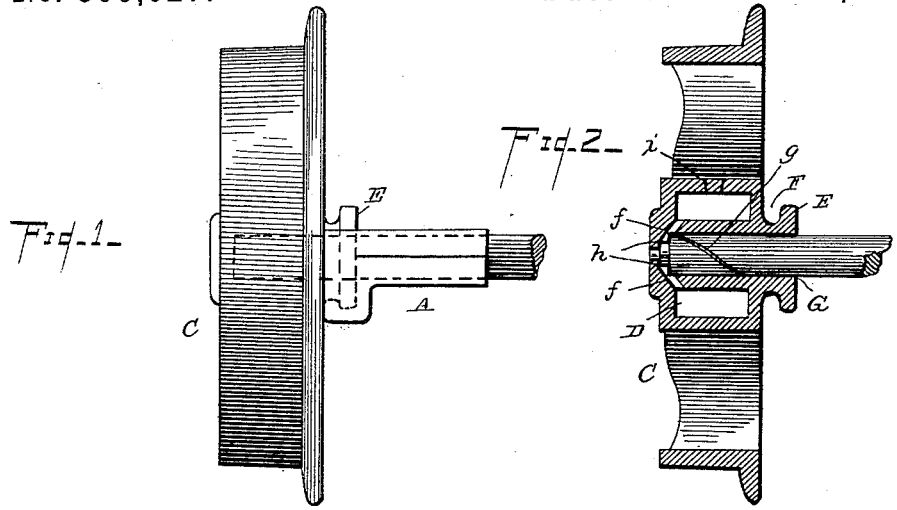
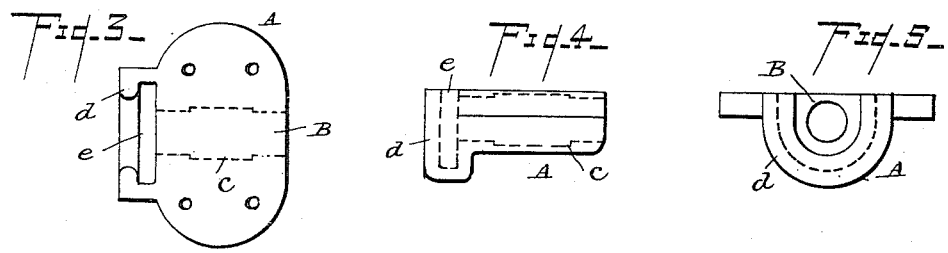
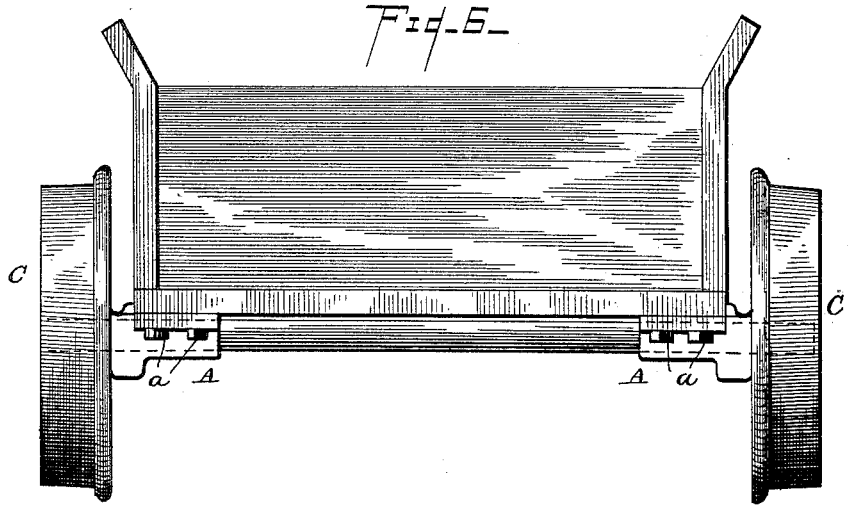
WITNESSES
Edwin L. Yewell
Curtis Lammond
INVENTOR
George W. Parker
By
E. Everett Ellis, Attorney

UNITED STATES PATENT OFFICE.

GEORGE W. PARKER, OF TERRE HAUTE, INDIANA.

AXLE-LUBRICATOR FOR CARS.

SPECIFICATION forming part of Letters Patent No. 399,627, dated March 12, 1889.

Application filed May 8, 1888. Serial No. 273,205. (No model.)

*To all whom it may concern:*

Be it known that I, GEORGE W. PARKER, a citizen of the United States, residing at Terre Haute, in the county of Vigo and State of Indiana, have invented certain new and useful Improvements in Coal or Ore Cars; and I do hereby declare the following to be a full, clear, and exact description of the invention, such as will enable others skilled in the art to which it appertains to make and use the same.

My invention relates to certain new and useful improvements in coal or ore cars, although adapted to other vehicles of a similar nature; and it consists, substantially, in such features of construction, arrangement, and combinations of parts as will hereinafter be more particularly described or pointed out.

The object of the invention is to supply a simple and effective clamp or bearing for the axle, by which the same will be maintained in position.

Further, the invention has for its object to effect a more perfect lubrication of the several parts than is accomplished by many former inventions on the subject, and also to simplify the construction of parts generally, and very materially cheapen the cost of manufacture.

Further, the invention has for its object to so construct the axle-clamp and wheel as that each may be free to revolve independently of the other, and thereby reduce friction between the parts to a minimum.

Finally, the invention has such other objects in view as will more fully hereinafter appear, when taken in connection with the accompanying drawings, wherein—

Figure 1 represents a side view of wheel and car embodying my invention, the same indicating the relation of the two when in operation. Fig. 2 is a sectional view taken about centrally of the wheel to more clearly indicate its construction, the axle being in elevation, so as to show the construction thereof. Fig. 3 is a top or plan view of the clamp. Fig. 4 is a side view thereof, and Fig. 5 an end view. Fig. 6 is an end view of car, showing the same as it appears when constructed and arranged according to my invention.

In carrying my invention into effect I provide a clamp designed for attachment to the under side of the body of the car, and this clamp is formed at one end with a raised collar and groove, to adapt it to engage or fit the correspondingly-constructed wheel-hub with which it is designed to co-operate. The said clamp is also formed with an opening for the passage of the axle, as well as with a chamber for containing a suitable lubricating compound or material. The inner end of the hub of the wheel is formed with a collar and groove like that of the clamp, and the interior of said hub is formed with an oil-chamber having suitable inclined apertures, through which the oil or lubricant is permitted to pass to the journal of the axle, the said oil-chamber having a suitable centrally-arranged feed-aperture adapted to be closed by a suitable plug.

The journal of the axle is so formed at the end as to preclude any possibility of closing the inclined apertures of the oil-reservoir, and the said journal is formed to one side with a groove running in a right-hand spiral halfway around the same, while to the other side is formed a corresponding groove or channel running half-way around in the opposite or left-hand direction. Thus as the oil escapes from the reservoir of the wheel through the feed-apertures it will be carried by these spiral tending grooves which run together. The result is that the oil is carried to the center of the wheel and there held until again taken up and conducted back to its chamber or reservoir.

Reference being had to the several parts by the letters marked thereon, A represents the clamp, the same having a number of holes for the passage of bolts *a* to secure it to the under side of the body of the car. This clamp is formed with a central longitudinal opening, B, for the passage of the axle, and has a chamber, *c*, designed to receive any suitable lubricant to reduce friction. At one end this clamp is formed with a raised collar, *d*, and a groove, *e*, the said collar and groove being designed to fit corresponding portions formed on the inner end of the hub of the wheel.

C represents the wheel, the same being formed with a central opening for the entrance of the journal of the axle, surrounding which opening is a continuous oil chamber or reservoir, D, the said chamber being in communication with the interior of the hub through outwardly-inclined apertures $f\ f$. The inner end of the hub of the wheel is formed with a raised collar, E, and groove F, corresponding to those of the clamp A, the two fitting and working together, as hereinafter briefly explained.

G represents the axle, which, as will be seen in Fig. 2, is formed to one side with a spirally-tending channel or groove, $g$, the same having also to the opposite side a similar groove or channel, (not herein shown,) the said grooves being designed to meet or come together at their ends, each tending in a direction reverse to the other. The journal of the axle is formed at the end with projections $h\ h$, which tend to prevent the end of the journal from becoming jammed too closely against the wheel, which, if not provided against, would close up the apertures $f\ f$ and prevent proper supply of lubricant. The oil or lubricant is supplied through an opening, $i$, designed to be closed by the usual stopper or plug.

From the foregoing description it will be seen that from the construction explained the axle and wheel are free to revolve independent of each other, and as a result the least possible amount of wear and friction is had. It will further be seen that the corresponding grooves and collars of the hub and clamp fit into each other freely but accurately, and thus permit of a free and perfect operation of the parts. It will still further be seen in what manner the journal of the axle will be kept continuously lubricated from the materials supplied thereto from the oil-chamber in the wheel.

Having thus described my invention, what I claim as new, and desire to secure by Letters Patent, is—

1. In coal-cars and like vehicles, an axle-clamp or journal-bearing having at one end a raised collar and a groove, and provided with a central longitudinal opening and a lubricating-chamber, substantially as described.

2. In coal-cars or like vehicles, a wheel constructed with a central opening surrounded by a continuous oil chamber or reservoir communicating with such opening through outwardly-inclined apertures, the said wheel having the inner end of its hub constructed with a raised collar and continuous groove, substantially as described.

3. In coal-cars and like vehicles, the combination, with an axle-clamp or journal-bearing constructed at one end with a raised collar and a groove and secured to the under side of the vehicle, of a wheel having the inner end of its hub constructed with a corresponding collar and groove, the collars and grooves of the two being adapted to fit each other, substantially in the manner shown and described.

4. In coal-cars and like vehicles, the combination, with an axle-clamp or journal-bearing constructed at one end with a collar and groove, of an axle having spiral grooves on opposite sides of its journal tending in an opposite direction to each other, and a wheel having a central opening for the journal surrounded by a continuous oil chamber or reservoir communicating with such opening through suitable apertures, the said wheel having the inner end of its hub constructed with a collar and groove corresponding to the clamp, substantially as described.

In testimony whereof I affix my signature in presence of two witnesses.

GEORGE W. PARKER.

Witnesses:
B. H. SANDERSON,
S. ROCHE.